US005702127A

United States Patent [19]

Korondi, Jr.

[11] Patent Number: 5,702,127

[45] Date of Patent: Dec. 30, 1997

[54] FORM WITH SELECTIVELY SPACED APPLIANCE LABELS

[75] Inventor: Joseph Korondi, Jr., Peoria, Ill.

[73] Assignee: Uarco Incorporated, Barrington, Ill.

[21] Appl. No.: 526,756

[22] Filed: Sep. 11, 1995

[51] Int. Cl.[6] .............................. B42D 15/00; B32B 3/10

[52] U.S. Cl. .......................... 283/81; 283/101; 283/105; 283/107; 283/108; 281/2; 281/5; 428/42.2; 428/43

[58] Field of Search ............................ 283/81, 105, 101, 283/107, 108; 281/2, 5; 428/43, 42.2, 213, 195, 187, 174

[56] References Cited

U.S. PATENT DOCUMENTS

| | | | |
|---|---|---|---|
| 4,188,427 | 2/1980 | Grass | 428/43 X |
| 4,946,723 | 8/1990 | Paules et al. | 428/43 |
| 4,977,006 | 12/1990 | Smith et al. | 428/42.2 |
| 5,106,123 | 4/1992 | Shieh | 281/2 X |
| 5,209,698 | 5/1993 | Dolan | 281/2 X |
| 5,230,938 | 7/1993 | Hess et al. | 428/43 X |
| 5,279,690 | 1/1994 | Hess, Jr. et al. | 156/226 |
| 5,284,363 | 2/1994 | Gartner et al. | 283/81 |
| 5,284,689 | 2/1994 | Laurash et al. | 283/81 X |
| 5,346,739 | 9/1994 | Nassoiy | 281/2 X |
| 5,348,780 | 9/1994 | Boggs et al. . | |
| 5,482,753 | 1/1996 | Langan et al. | 281/2 X |
| 5,507,901 | 4/1996 | Limina et al. | 40/638 |

*Primary Examiner*—Frances Han

*Attorney, Agent, or Firm*—Wood, Phillips, VanSanten, Clark & Mortimer

[57] ABSTRACT

A label form having a release liner, a label ply having a pair of substantially parallel perforations spaced apart a selected distance, and a layer of adhesive between the release liner and the label ply. The adhesive is deadened in the area between the perforations, defining a spacing strip between two labels. Appliance information may be printed on such labels for application to an appliance. The label ply is removed from the release ply and then applied to a surface, with the spacing strip then removed so that the two labels on opposite sides of the strip are secured to the surface with a preselected distance therebetween. The labels may be made by perforating a label ply along a plurality of lines to define the spacing strip between adjacent perforated lines, applying adhesive to one side of one of the plies, deadening the adhesive applied to the spacing strip, and bringing the plies together with the adhesive therebetween.

11 Claims, 1 Drawing Sheet

FORM WITH SELECTIVELY SPACED APPLIANCE LABELS

BACKGROUND OF THE INVENTION

1. Technical Field

The present invention is directed toward label forms, and more particularly toward forms providing a plurality of labels which may be applied in selected relative positions on a surface.

2. Background Art

Label forms are well known in the art, in which a release liner and a label liner are brought together with a layer of pressure sensitive adhesive therebetween, and the label liner then die cut to form a label. The release liner has a lesser adherence to the adhesive than does the label ply so that the adhesive sticks to the die cut label when removed from the form. The die cut label with an adhesive covered back can then be applied to another surface as desired.

In some applications, for example, appliance labels, it is necessary to apply a plurality of labels containing different types of information on the appliance. Further, in many such applications it is not only desirable but required to leave a certain amount of spacing around certain labels, at least in part to ensure that those labels and the information thereon stand out for a potential purchaser or user of the appliance.

Ensuring that such requirements are met has been difficult for a number or reasons. For example, the person placing the labels on the appliance might not be adequately informed as to the spacing required around particular labels. Further, even if they are aware of the requirements, they may not necessarily be met by a person who estimates the spacing by eye.

Using instruments to measure the spacing when applying the labels can help, but can significantly add to the time and therefore the cost associated with applying the labels. Moreover, even when the person measures the required spacing with an instrument before applying the second label, he still may not position the label properly.

Still further, when the labels are moved into position for application on a surface, it is not uncommon for a portion of the label to inadvertently stick to the wrong place on the surface of the appliance before the full label is properly positioned. When that occurs, it is necessary to remove adhered portions of the label from the surface before repositioning the label in a second attempt to properly position it on the appliance. With some label materials and/or adhesive, such removal can damage the label, scar the appliance surface, and/or negatively impact the subsequent adhesion of the label to the appliance.

Still other problems can be encountered when the labels must be applied to a limited space on the surface of the appliance. Any imprecision in applying even the first label can result in wrong placement since there might not then be adequate room to provide the required spacing when applying the second label.

Even the aesthetic appearance of the labels can be important to the commercial impression of the product to which the labels are applied. For example, when adjacent spaced labels are not properly aligned relative to each other (even if the required space between them is adequate), that sloppy appearance can adversely effect a potential purchaser's opinion of the quality of the appliance itself.

The present invention is directed toward overcoming one or more of the problems set forth above.

SUMMARY OF THE INVENTION

In one aspect of the present invention, a label form is provided having a release liner, a label ply having a pair of substantially parallel perforations spaced apart a selected distance, and a layer of adhesive between the release liner and the label ply, said adhesive being deadened in the area between the perforations.

In a preferred form of this aspect of the invention, a single label member having a plurality of labels is defined where the portion of the label ply between the perforations is a spacing strip which may be removed after application of the label member to a surface to ensure that the applied labels are spaced a selected distance apart.

In another preferred form of this aspect of the invention, appliance information is printed on the first and second labels, and indicia is printed on the spacing strip indicating that the strip should be removed after the label is adhered to an appliance.

In another aspect of the present invention, a method of applying a plurality of labels to an appliance is provided, including the steps of (a) selecting a label form such as described above, (b) removing the label ply from the release ply, (c) applying the label ply to an appliance; and (d) removing the spacing strip from the appliance, whereby the portions of the label ply remaining adhered to the appliance define first and second labels with a preselected distance therebetween.

In still another aspect of the present invention, a method of making first and second labels easily applicable to a surface with a selected spacing between the labels is provided, comprising the steps of (a) providing a release liner ply and a label ply, (b) perforating the label ply along a plurality of lines to define a spacing strip between adjacent perforated lines, (c) applying adhesive to one side of one of the plies, (d) deadening the adhesive applied to the spacing strip, and (e) bringing the plies together with the adhesive therebetween.

In a preferred form of this aspect of the present invention, the labels are printed with information relating to the appliance, and the side of the spacing strip opposite the deadened adhesive is printed with indicia that the strip should be removed after the label is adhered to an appliance.

In another preferred form of this aspect of the present invention, the label ply is die cut to define a unitary label member having first and second labels connected at the perforated lines to opposite sides of a spacing strip and to further define a web of waste material outside the unitary label member, and the web of waste material is then removed from the release liner ply.

In still another preferred form of this aspect of the invention, the release liner ply and the label ply are provided along a continuous length, and the label ply is cut to separate the first and second labels of one form set from the first and second labels of adjacent sets.

It is an object of the invention to provide a label form which is easy and inexpensive to manufacture and use.

It is another object of the invention to provide a label form which can be easily, accurately and inexpensively used to apply multiple labels to a surface with a specific spacing between the labels, including application to areas limited in size.

It is still another object of the invention to provide a label form which can be used to precisely apply multiple labels to a surface with minimal risk of misapplication of the labels.

It is yet another object of the invention to provide a label form which can be used to precisely apply multiple labels with minimal risk that the label will be damaged, or will scar the surface to which it is being applied.

Another object of the invention is to provide a label form which can be used to precisely apply multiple labels with minimal risk that the adhesive will be negatively impacted during that application so as to interfere with the secure adhesion of the labels once properly applied.

Yet another object of the invention is to provide a label form providing multiple labels for a product, which labels may be applied so as to not detract from, or create a negative impression of, the overall quality of the product itself.

DESCRIPTION OF THE PREFERRED EMBODIMENT

Figure 1:
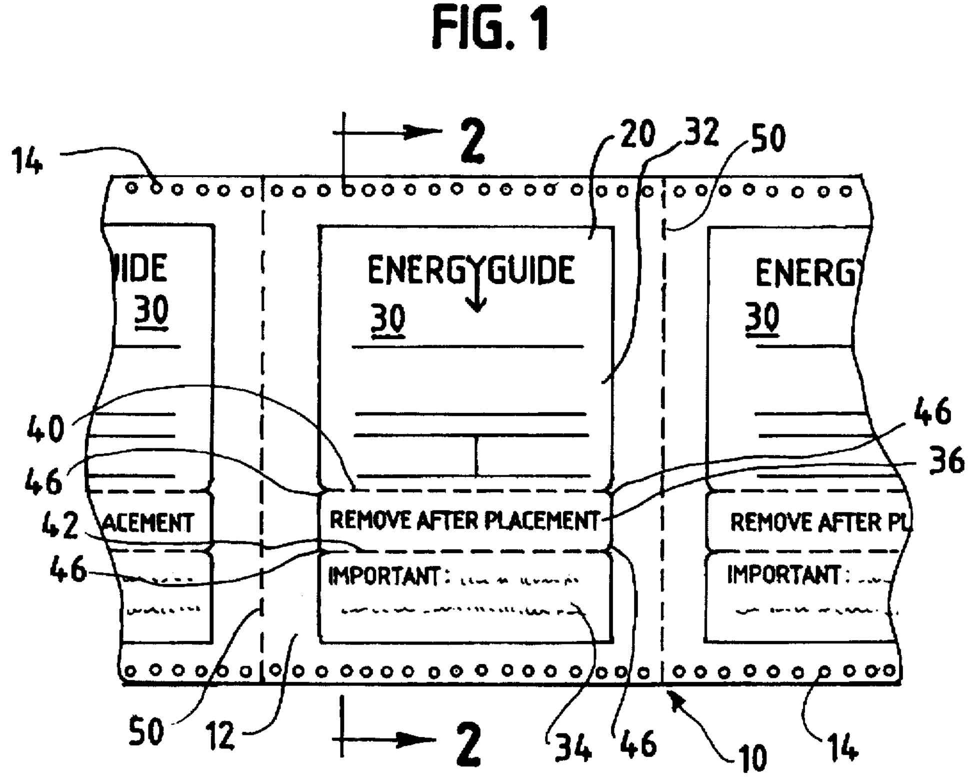
FIG. 1 is a plan view of a label form embodying the present invention.
Figure 2:
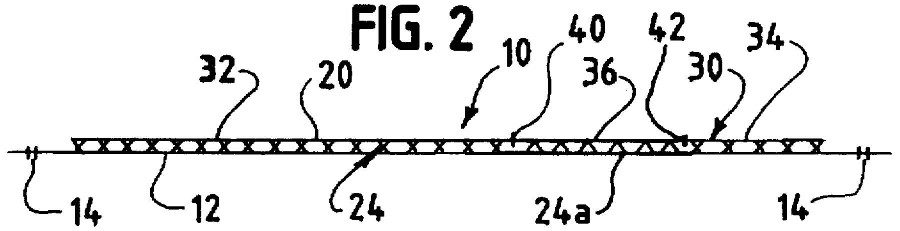
FIG. 2 is a cross-sectional view, taken along line 2—2 of FIG. 1.

A label form 10 made according to the present invention is shown in FIGS. 1–2.

In one preferred embodiment, the label form 10 comprises a release liner ply 12. Release liners are well known in the art, and typically have a silicone covered side to give that side a significantly reduced adherence to any adhesive applied thereto. In the embodiment shown in FIGS. 1–2, the release liner 12 is continuous. Tractor feed openings 14 are also provided along the sides of the release liner 12, which openings 14 can be used to guide the continuous form during subsequent printing, depending on the particular printers being used. Thus, if the label form 10 is to be printed on printers which do not require tractor feed openings, then such openings can be omitted as would be well known by anyone of ordinary skill in this art.

Applied to the release liner 12 is a label ply 20, with a layer of pressure sensitive adhesive 24 between the plies 12, 20 as described in further detail hereafter. The label ply 20 may be made of a wide variety of materials depending on the requirements for the labels. For example, the label ply 20 may be paper in many instances, though in situations where high durability is required the label ply 20 may be made of plastics such as polyester, or other materials providing high durability.

In embodiments made according to the process illustrated in FIG. 3 and discussed in greater detail below, separate label members 30 are defined on the release liner 12 by die cutting the release liner 12. Alternatively, it will be understood that the invention disclosed herein could also be practiced by tipping discrete label members 30 onto the release liner 12, according to procedures which are well known in the art.

Each label member 30 contains at least two separated labels 32, 34 on opposite sides of a spacing strip 36. The labels 32, 34 are connected to the spacing strip 36 by substantially parallel perforations 40, 42. Of course, the perforations 40, 42 can be any suitable line of weakening which connects the spacing strip 36 to the two labels 32, 34 but which also ensure that removal of the spacing strip 36 will occur along those lines of weakening as should be apparent once a full understanding of the present invention is obtained. To further ensure easy removal, the corners 46 of the spacing strip 36 can be rounded to enable a person to easily grasp the strip 36.

In the area of the spacing strip 36, the adhesive 24a is deadened or neutralized by an adhesive neutralizer suitable for use with the particular pressure sensitive adhesive 24 used. Deadening the adhesive 24a substantially eliminates the sticky characteristics of the adhesive. One suitable method of deadening pressure sensitive adhesives is through the use of a deadening material and ultra violet (UV) light, such as is generally known in the art and described in further detail hereafter.

In the preferred embodiment shown in FIGS. 1–2, the adhesive 24 is across substantially the full width of the label ply 20. In such a configuration, the deadened adhesive 24a serves as a barrier to the adjacent adhesive 24 (on the labels 32, 34) to prevent running or oozing of the non-deadened adhesive 24 into the area of the spacing strip 36. Therefore, a sharp delineation between sticky areas can be provided to enure both that the spacing strip 36 may be easily removed once the label member 30 is stuck to a surface (i.e., the spacing strip 36 will only have deadened adhesive between it and the surface), and (2) the labels 32, 34 remaining on the surface after removal of the spacing strip 36 will be fully attached to the surface without free edges which might tear or curl up away from the surface.

In the FIG. 1–2 embodiment, the release liner 12 is provided with across the web perforations 50 to permit the adjacent label members 30 to be easily separated as desired. Depending on the requirements of the ultimate user of the label form 10 and particularly the printer in which further information might be added thereto, the release liner 12 could alternatively be fully cut across the web to provide cut sheets, or lines of weakening could alternatively be completely omitted to provide a continuous roll of label forms 20.

Referring now particularly to the appliance type label form 10 shown in FIG. 1, each of the labels 32, 34 can first be printed with general information such as might be required for a particular type or group of appliances. The label form 10 can then be further printed by the user with particular information required or desired relating to the particular appliance to which the labels 32, 34 are to be applied. The spacing strip 36 is also prominently printed with indicia, such as "REMOVE AFTER PLACEMENT" or "PLEASE REMOVE THIS STRIP", to serve as a reminder of the person who places the label member 30 on the appliance should ultimately remove the spacing strip 36.

Specifically, the label form 10 is used in the following manner. Once a particular label member 30 has been printed with all of the desired information, it is removed as a unit from the release liner 12. The label member 30 is then placed as a unit flat on the surface where required. The spacing strip 36 which, due to the deadened adhesive 24a, will not be adhered to the surface so that the person who applied the label member 30 may then grasp one end of the spacing strip 36 and easily remove it from between the two labels 32, 34. The two labels 32, 34 will thus be placed in perfectly aligned orientation relative to one another and will further have the precise spacing between them as might be desired or even required in some instances.

It should thus be apparent that application of the label member 30 will be inexpensive and quick, will require no special measurements, and will be virtually guaranteed to result in proper placement of multiple labels every time.

It should be understood that such advantages could be obtained with a wide variety of forms other than the particular form 10 illustrated in FIGS. 1–2. For example, the label member 30 with spacing strip 36 such as described could be combined on a release liner on which a number of other labels (such as shipping labels) could be applied for different purposes. Alternatively, a base ply consisting of two different plies adhered at an overlapping strip could also be used, with the label member of the present invention applied to one of the plies and the other ply serving a different purpose (such as a paper form for printed information like product invoices), as is known to those skilled in this art. As another alternative, the label member and release ply of the present invention could be applied (by "tipping", as is known in the art) to still another base ply in a "piggyback" type configuration.

It should also be understood that more than one spacing strip with deadened adhesive could also be formed in the label member. For example, two spacing strips could be formed for application of three adjacent but spaced labels. Further, such spacing strips could also be formed in different orientations to provide for spacing along the sides of the labels as well as beneath of above the labels.

Figure 3:
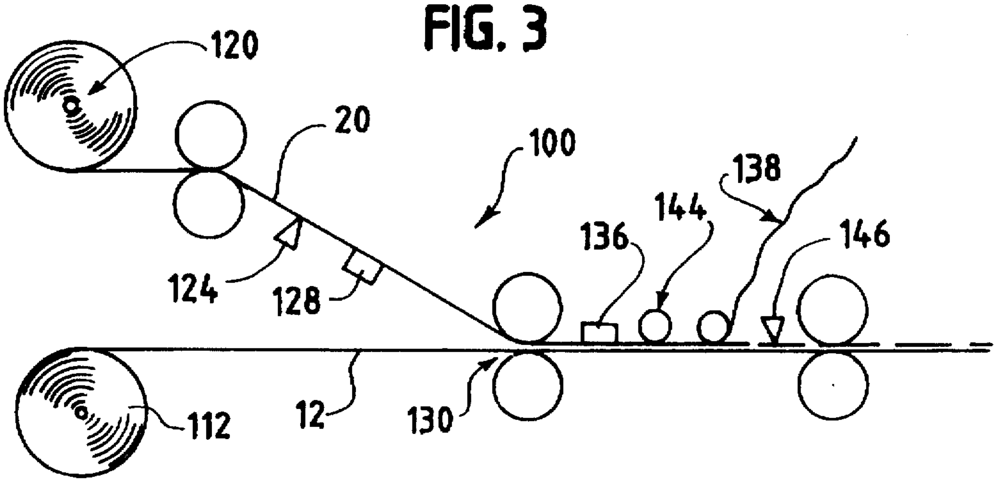
FIG. 3 is a schematic view of an apparatus for making the label form of the present invention.

An apparatus 100 illustrating one manner of making the present invention is schematically shown in FIG. 3.

The apparatus 100 feeds a continuous release liner ply 12 from a supply roll 112 and a continuous label ply 20 from a label ply supply roll 120. Prior to bringing the two plies together, an adhesive applicator 124 15 applies adhesive 24 to one side of the label ply 20.

After the adhesive 24 is applied, the adhesive is deadened in the area beneath the spacer strip 36 at the deadening station 128. In a preferred known form of the deadening station 128, an applicator applies a suitable deadened in a suitable manner. For example, if the preferred embodiment is used in which the perforations extend along the continuous direction of the plies, then a brush or continuous roller or the like may be used. Alternatively, in an embodiment in which the perforations 40, 42 extend transversely across the label form 10, a printing plate type applicator may be used, which applicator only periodically applies deadened as each spacing strip passes the applicator. Still other methods of applying the deadened should be apparent to those of ordinary skill in this art once the invention disclosed herein is understood, and such methods would be within the scope of the present invention.

One known deadener which could be used to remove the sticky characteristics of conventional pressure sensitive adhesive in the area of the spacing strip 36 is a UV ink known as UV Deadened No. UF 170050, which is available from Environmental Inks and Coatings Corporation, 1785 Armitage Court, Addison, IL 60101. Such deadener is first applied to the adhesive and then cured by a suitably intense ultra-violet light. Such light can be provided, for example, by ultra-violet (UV) bulbs having an intensive of 300 watts/square inch. Of course, still other deadeners which may be applied to a specific area of adhesive to deaden or neutralize the sticky characteristic of the adhesive in that area could also be used within the scope of the present invention.

Further, though the adhesive 24 is, in the manner of making this embodiment as shown in FIG. 3, first applied to the label ply 20, it should also be understood that the adhesive 24 could instead be first applied to the release liner 12, though the other procedure is preferred to ensure proper alignment of the deadened adhesive relative to the spacing strip 36.

Still further, the adhesive could be applied in a manner so that the spacing strip 36 is not fully covered with adhesive, with deadening being done at the edges of the spacing strip 36 to ensure that the adhesive 24*a* which is on the spacing strip 36 is deadened. For example, the adhesive could be applied at least up to the area of the spacing strip and then deadener applied to deaden any adhesive which oozed or bled onto the spacing strip. In this manner, it could be ensured that adhesive entirely up to the edge of the labels would be present.

Referring again to FIG. 3, after the adhesive has been suitably prepared on one of the plies as described above, the two plies are then brought together, as at reference number 130.

Thereafter, the a die cut station 136 may die cut the label members 30 in the label ply 20. In such a configuration with a continuous label ply 20, a scrap web 138 of label ply is formed around the label members 30, which scrap web 138 may thereafter be removed from the release liner 12 so as to make the label members 30 easily accessible for removal from the release ply 12 when intended to be applied to a surface, such as an appliance. Perforating wheels 144 can be used to form the perforations 40, 42 defining the spacing strips 36 and a cutting bar 146 can also be used to cut across the web of the form 10 to either form cut sheets as previously described or to form the perforations 50 allowing for easy separation of adjacent label members 30 prior to application on a surface.

It should be understood that the particular order in which the above are accomplished could be varied within the scope of the invention. That is, though removal of the scrap web 138 must come after the die cut station 136, it could be accomplished before the perforating wheels 144 or after the cutting bar 146. Similarly, the perforating wheels 144 could be located before the die cutting station 136 or even before the adhesive applicator 124.

As discussed previously, the above discussed method of manufacture is merely one preferred method. Where discrete label members 30 are used without a continuous label ply, those label members 30 can be tipped onto an underlying release liner. Such tipping could be accomplished in any suitable manner such as, for example, securing the label members 30 by a vacuum to a cylinder rotating in sequence with the advancing release liner. With such a structure, there would, of course, be no scrap web of label material. Such a procedure might therefore be particularly desirable when the label members 30 are formed of more expensive material.

Further, if the perforations 40, 42 extend transversely across the label form 10 such as previously described, the an across the web cutter could be used, rather than cutting wheels, to score the line of weakening defining the spacing strip 36.

In short, it should be understood that such label forms made according to the present invention can be made in a variety of ways and with a variety of materials.

Still other aspects, objects, and advantages of the present invention can be obtained from a study of the specification, the drawings, and the appended claims.

I claim:

1. A label form providing multiple appliance labels for application to an appliance requiring specific spacing between labels, comprising:

- a release liner;
- a label ply having a pair of substantially parallel perforations spaced apart a selected distance, said label ply between said perforations defining a strip with first and Second information labels attached to opposite sides of the strip at the perforations; and
- a layer of adhesive between the release liner and the label ply, said adhesive on the strip being deadened.

2. The form of claim 1, wherein the adhesive is pressure sensitive.

3. The form of claim 1, further comprising indicia printed on the strip indicating that the strip should be removed after the label is adhered to an appliance.

4. A form having a plurality of appliance labels easily applied to an appliance with a required spacing between labels, comprising:

a release ply having a front face and a rear face, said release ply front face having a reduced adherence to adhesive;

a label ply having a pair of perforations spaced apart a selected distance, said label ply having a front face and a rear face, said label ply rear face having a greater adherence to adhesive than said release ply front face, said label ply further defining a strip between said perforations with first and second information labels attached to opposite sides of the strip at the perforations; and a layer of adhesive between the release ply front face and the label ply rear face, said adhesive on the strip being deadened.

5.The form of claim 4 wherein the adhesive is pressure sensitive.

6. The form of claim 4, further comprising indicia printed on the strip indicating that the strip should be removed after the label is adhered to an appliance.

7. A method of applying a plurality of labels to an appliance with a selected spacing therebetween, comprising the steps of:

(a) selecting a label form having a release liner, a label ply having a pair of substantially parallel perforations spaced apart a preselected distance, said perforations defining a spacing strip therebetween with first and second information labels attached to opposite sides of the spacing strip at the perforations, and a layer of adhesive between the release liner and the label ply, said adhesive being deadened in the area of the spacing strip;

(b) removing the label ply from the release ply;

(c) applying said label ply to an appliance; and (d) removing the spacing strip from the appliance, whereby the portions of the label ply remaining adhered to said appliance define first and second labels with a preselected distance therebetween.

8. The method of claim 7, wherein the layer of adhesive of the label form selected in step (a) is pressure sensitive.

9. The method of claim 7, further comprising the step of (a1) printing said first and second labels with information relating to the appliance, said step (a1) being done between step (a) and step (b).

10. The method of claim 7, further comprising the step of printing the side of the spacing strip opposite the deadened adhesive with indicia that said strip should be removed after the label is adhered to an appliance, said printing step being done prior to step (b).

11. The method of claim 7, wherein said spacing strip is removed in step (d) by manually pulling said spacing strip to tear the perforations connecting said strip to the first and second labels.

* * * * *